(12) United States Patent
Bhattacharjee et al.

(10) Patent No.: US 10,310,969 B2
(45) Date of Patent: Jun. 4, 2019

(54) SYSTEMS AND METHODS FOR TEST PREDICTION IN CONTINUOUS INTEGRATION ENVIRONMENTS

(71) Applicant: Oracle International Corporation, Redwood Shores, CA (US)

(72) Inventors: Abhijit Bhattacharjee, Karnataka (IN); Manoj Dash, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/610,473

(22) Filed: May 31, 2017

(65) Prior Publication Data

US 2018/0349257 A1    Dec. 6, 2018

(51) Int. Cl.
*G06F 9/44* (2018.01)
*G06F 11/36* (2006.01)
*G06F 8/41* (2018.01)
*G06F 8/71* (2018.01)

(52) U.S. Cl.
CPC ............ *G06F 11/3688* (2013.01); *G06F 8/41* (2013.01); *G06F 8/71* (2013.01)

(58) Field of Classification Search
CPC .................................................. G06F 11/3688
USPC ......................................................... 717/124
See application file for complete search history.

(56) References Cited

U.S. PATENT DOCUMENTS

| | | | |
|---|---|---|---|
| 8,978,009 B2 | 3/2015 | Mizrahi | |
| 8,984,485 B2 | 3/2015 | Elshishiny et al. | |
| 9,489,289 B2 | 11/2016 | Hu et al. | |
| 9,697,109 B2* | 7/2017 | Kucharski | G06F 11/3688 |
| 2001/0037496 A1* | 11/2001 | Simonyi | G06F 8/30 717/146 |
| 2003/0188298 A1 | 10/2003 | Shaposhnick | |
| 2006/0277439 A1* | 12/2006 | Davia | G06F 11/3676 714/38.1 |
| 2009/0070746 A1 | 3/2009 | Dhurjati et al. | |
| 2014/0089896 A1 | 3/2014 | Mansour et al. | |
| 2015/0026121 A1 | 1/2015 | Shani et al. | |
| 2015/0121343 A1 | 4/2015 | Ganti et al. | |
| 2015/0261657 A1 | 9/2015 | Sravani et al. | |
| 2016/0085663 A1 | 3/2016 | Best | |

FOREIGN PATENT DOCUMENTS

WO        2015104635 A2      7/2015

OTHER PUBLICATIONS

Vidács, László, et al. "Test Suite Reduction for Fault Detection and Localization A Combined Approach" http://www.inf.u-szeged.hu/~beszedes/research/CR-csmr18wcre21_submission_54.pdf, accessed Jun. 2, 2017.

* cited by examiner

*Primary Examiner* — Wei Y Zhen
*Assistant Examiner* — Lanny N Ung
(74) *Attorney, Agent, or Firm* — Kilpatrick Townsend & Stockton LLP

(57) ABSTRACT

The present disclosure generally relates to predicting automated software tests for testing units of work delivery in a continuous integration development environment. More particularly, the present disclosure relates to systems and methods for improving the efficiency of code integration by predicting a subset of automated software tests from amongst a set of all available automated software tests, thereby improving testing time and reducing processing loads.

20 Claims, 12 Drawing Sheets

SYSTEMS AND METHODS FOR TEST PREDICTION IN CONTINUOUS INTEGRATION ENVIRONMENTS

TECHNICAL FIELD

The present disclosure generally relates to predicting automated software tests for testing units of work delivery in a continuous integration development environment. More particularly, the present disclosure relates to systems and methods for improving the efficiency of code integration by predicting a subset of automated software tests from amongst a set of all available automated software tests, thereby improving testing time and reducing processing loads.

BACKGROUND

Software applications can undergo frequent revisions to the underlying software code by different developers. However, as software applications become more robust (e.g., millions of lines of code), testing the software applications for errors after each revision becomes increasingly time consuming. For example, with every revision to the underlying code of a software application, a full suite of tests is typically executed to determine whether or not the code revisions caused errors. However, executing a full suite of tests can take days and can impose a significant burden on processing resources. Further, in situations with short delivery cycles, there is simply not enough time to run a full suite of tests before releasing the software product.

SUMMARY

Continuous integration is a software development practice where members of a team frequently integrate their work into a software application. Each integration can be verified by automated software tests that detect errors caused by the integration. Further, version control systems can be used to manage revisions made to the code of the software application for each integration. In particular, version control systems can capture a timestamp associated with every revision made to the underlying code and the individual who made the revisions (e.g., the software engineer or developer). A continuous integration development environment may be a software application (e.g., a PEOPLESOFT application with millions of lines of code) that can be revised, modified, edited, or changed over time by different teams of developers. Further, a unit of work delivery may be a particular instance of revisions made to the source code of a software application. For example, a unit of work delivery may include source code, binary code, and/or configuration files that were modified by a developer. Before integrating the unit of work delivery (e.g., revisions made to the source code) into the software application, the software application including the unit of work delivery is generally tested to determine whether the unit of work delivery would cause bugs or errors if integrated into the software application.

Certain embodiments of the present disclosure include systems and methods for predicting a subset of automated software tests, from amongst the set of all available automated software tests. Further, the present disclosure includes systems and methods that execute each automated software test of the subset to test whether integrating the unit of work delivery into the software application would cause bugs or errors. For example, an automated software test may be a test that is executed automatically by software test tools (e.g., PEOPLETOOLS Test Framework, SELENIUM and WINRUNNER, etc.) that can execute pre-scripted tests on a software application. An automated software test can also be any set of test inputs, execution conditions, and expected results developed for a particular objective, such as to exercise a particular program path or to verify compliance with a specific requirement. The predicted subset of automated tests can include a threshold number of automated software tests that can be performed to test (with a high degree of confidence) whether integrating the unit of work delivery into the software application would cause errors.

In some implementations, the subset of automated software tests can be predicted by referring to a previously-generated mapping table. The mapping table may be generated using a framework that collects function identifiers (e.g., function points) in real time for every test that is executed in the testing environment. The framework may leverage directives that are provided by a compiler. Any compiler can be used to test code, including, but not limited to, GNU Compiler Collection, Visual C++, clang or any compiler that would allow instrumentation calls for entry and/or exit to functions. A trace is generated when a test is executed within the testing environment. For example, the trace identifies the function identifier for any function that is executed as part of the test. The generated trace may then be stored in an in-memory data structure or a permanent storage appliance. As a non-limiting example, the data stored in the in-memory data structure may be correlated, scrubbed and uploaded into a SQL database as a cross reference table. The in-memory data structure may periodically be moved to a permanent data storage. Further, the mapping table can map each automated software test with the one or more functions that are called when the automated test is executed. For every called function, the mapping table can also track the number of times the function was called. Further, an instrumented call for entry and exit to functions can be added to the compiler so that the mapping can be updated as the function is being called.

When the unit of work delivery is submitted for testing, the version control system can be queried to determine the files that have been modified (e.g., the modified source code). The version control system can access a baseline version of the software application (e.g., the source code before the unit of work delivery) and a modified version of the software application (e.g., the source code including the unit of work delivery). Each of the baseline version and the modified version of the software application can be compiled to generate binary code (e.g., machine-readable code). The binary code of the baseline version can be compared with the binary code of the modified version of the software application to identify the functions that are affected by the revisions included in the unit of work delivery. The mapping table is then queried to determine the corresponding tests that are associated with the affected functions. The tests associated with the identified functions are then grouped as a subset of tests to be executed during the testing phase. The tests in the subset of tests may include a threshold number of tests that are predicted based on the revisions made to the source code in the unit of work delivery.

In some implementations, a computer-implemented method can be provided. The method can include accessing source code associated with one or more applications. For example, the source code can include one or more executable functions. An executable function can correspond to a stub. For example, a stub can include executable code that identifies one or more tests to be performed on the executable function. Each test can include instructions for detecting errors in the executable function. Further, the method can include transforming the source code into baseline machine-readable code. The transformation of the source code can include compiling the one or more executable functions included in the source code. The method can also include detecting modified source code and transforming the modified source code into modified machine-readable code. The modified source code can include a modification to an executable function of the one or more executable functions included in the source code. In addition, the method can include accessing a mapping table that identifies a set of tests to be performed on the source code. One or more tests of the set of tests can correspond to an executable function of the one or more executable functions included in the source code. The baseline machine-readable code can be compared with the modified machine-readable code, and the comparison can result in identifying the modified executable function. The method can include determining a subset of the set of tests. Further, the identification of the subset of tests can be performed using the mapping table and the modified executable function. Additionally, the method can include performing each test of the subset of tests to identify whether the modified machine-readable code includes one or more errors.

A system can be provided that includes one or more data processors and a non-transitory computer-readable storage medium containing instructions which, when executed on the one or more data processors, cause the one or more data processors to perform the methods disclosed herein. In addition, a computer-program product tangibly embodied in a non-transitory machine-readable storage medium can be provided. The non-transitory machine-readable storage medium can include instructions configured to cause a data processing apparatus to perform the methods disclosed herein.

Advantageously, the embodiments described above and herein can substantially reduce the time involved in testing software applications and the efficiency of processing resources can be improved. As only a non-limiting example, if there are 6000 available automated software tests, testing a software application can take roughly two days. However, using embodiments described above and herein, a subset of 40 automated software tests can be predicted based on the revisions made in a unit of work delivery. In this example, the predicted 40 automated software tests can be executed in three to four hours, thereby substantially improving the testing process in a continuous integration development environment.

BRIEF DESCRIPTION OF THE DRAWINGS

The specification makes reference to the following appended figures, in which use of like reference numerals in different figures is intended to illustrate like or analogous components.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records" or "messages", without intent to limit the scope of the invention to any particular format for the data.

Figure 1A:
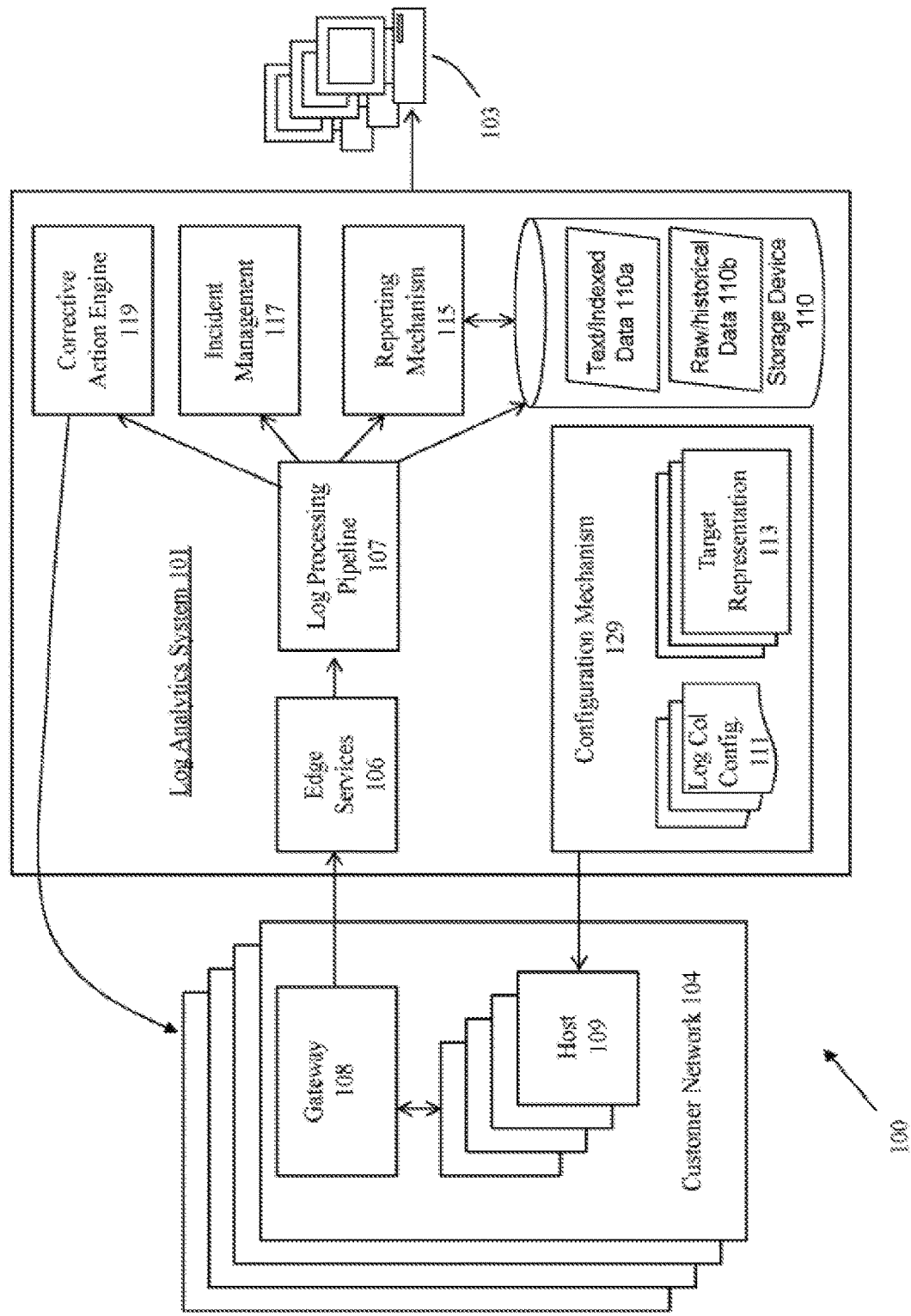
FIG. 1A illustrates an example system for configuring, collecting, and analyzing log data according to some embodiments of the invention.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
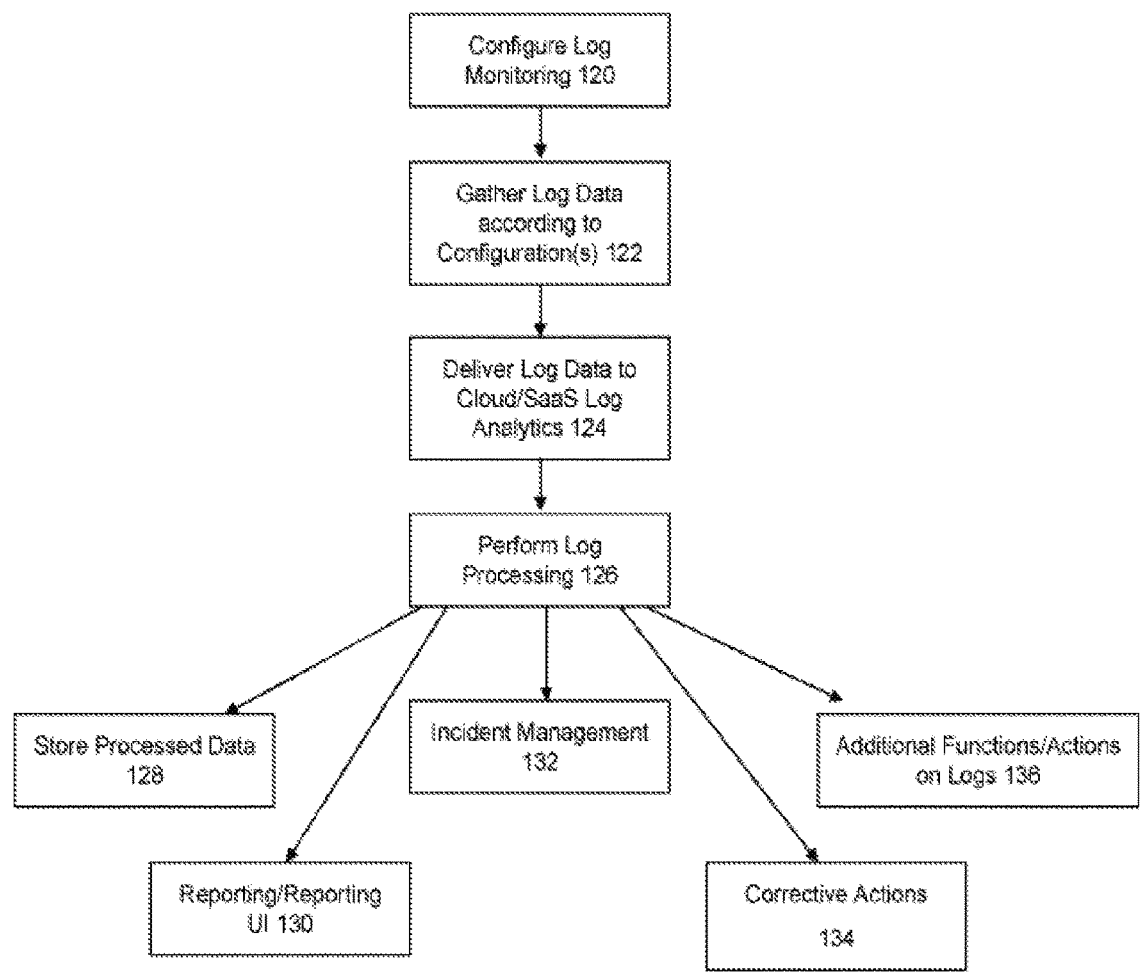
FIG. 1B shows a flowchart of an approach to use an example system to configure, collect, and analyze log data.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include customer-defined/customer-customized rules.

The target representations 113 identify "targets", which are individual components within the customer environment that that contain and/or produce logs. These targets are associated with specific components/hosts in the customer environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering.

At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

A SOLR cluster corresponds to an Apache™ open source enterprise search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
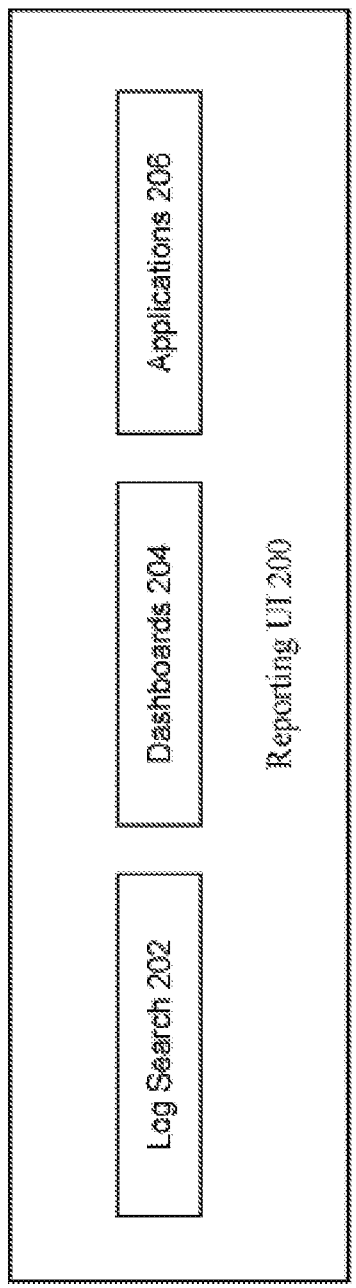
FIG. 2 illustrates an example reporting user interface.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
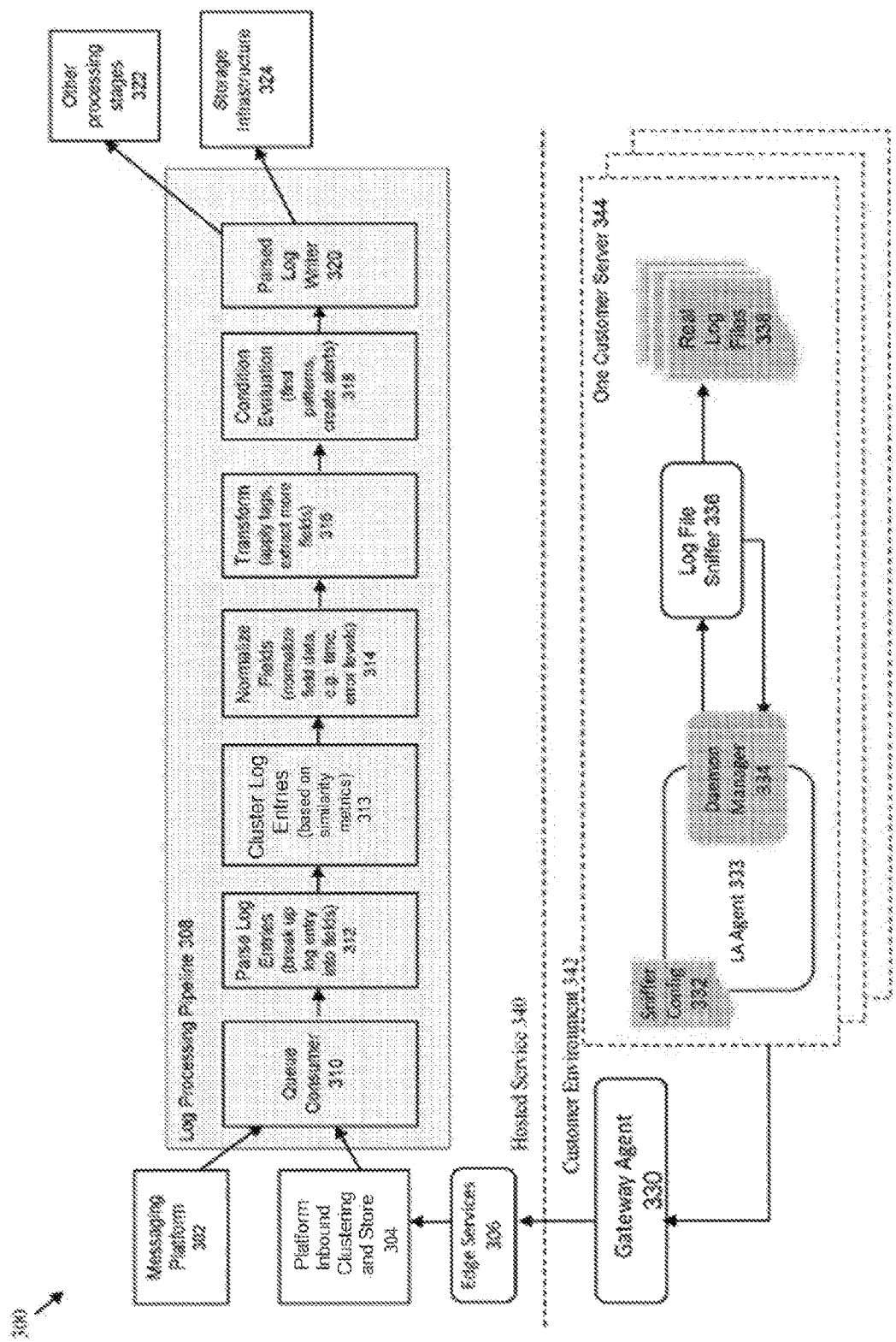
FIG. 3A illustrates a more detailed illustration of the internal structure of the log analytics system.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data can be immediately processed to assign each log message to an initial cluster and stored into an inbound data storage device 304 (the "platform inbound clustering store"). In some instances, an initial or preliminary processing may be performed at an ingest time, which can include a time corresponding to (e.g., before, shortly or immediately after, or concurrent with) storage of the data. The initial or preliminary processing may include (for example) detecting which parts of the data are non-variable components and determining an initial cluster for each log message based on the non-variable components detected in the message. For example, a hashing technique may be applied to a value of each non-variable component to generate an identifier of the initial cluster. The log message may then be stored in association with the identifier of the initial cluster or other cluster data can be stored to indicate that the log message is associated with the initial cluster. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields or components. The "log type" configured for the log specifies how to break up the log entry into the desired fields.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case un-abbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
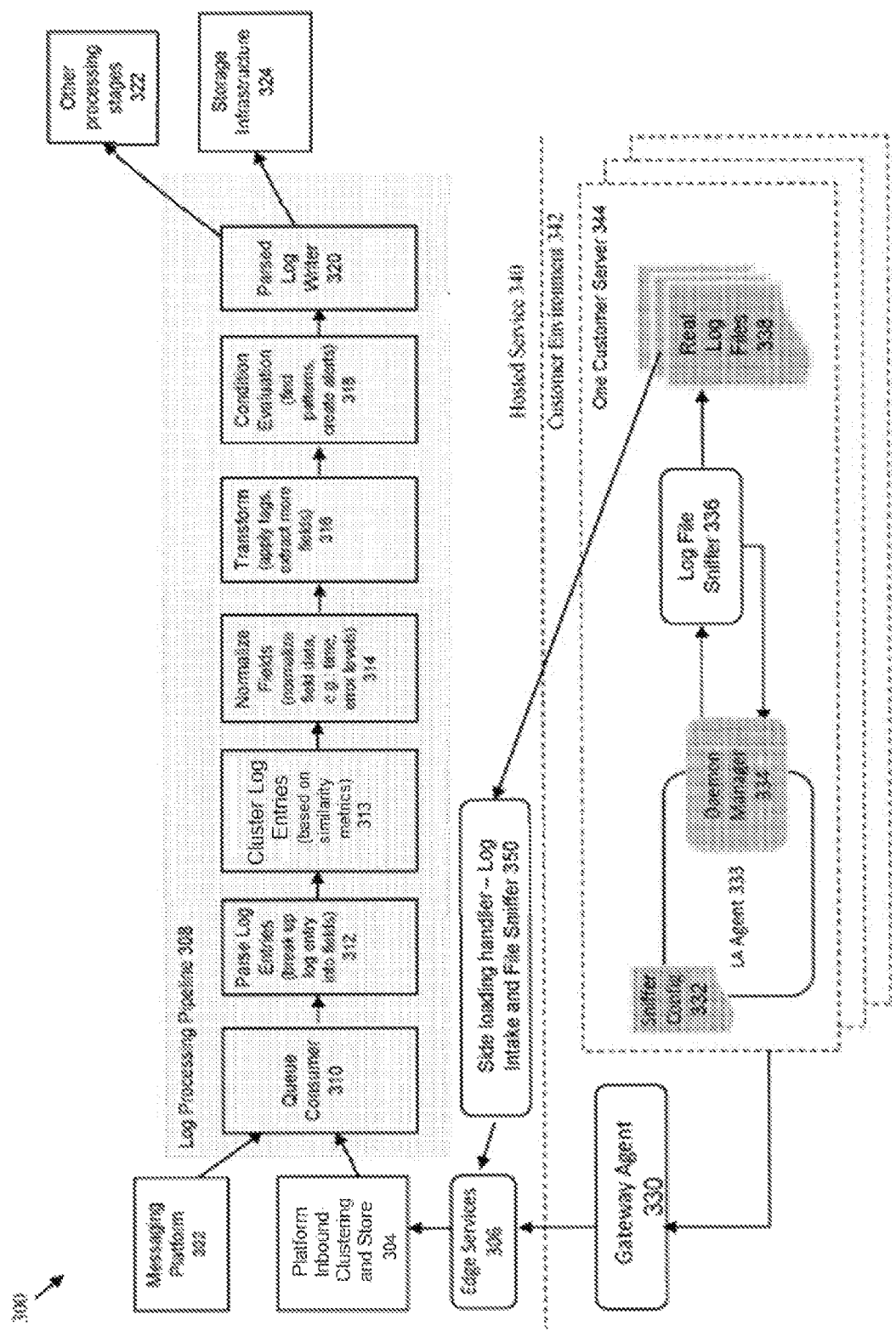
FIG. 3B illustrates a side loading mechanism to collect log data without needing to proceed through an agent on the client side.
Figure 3C:
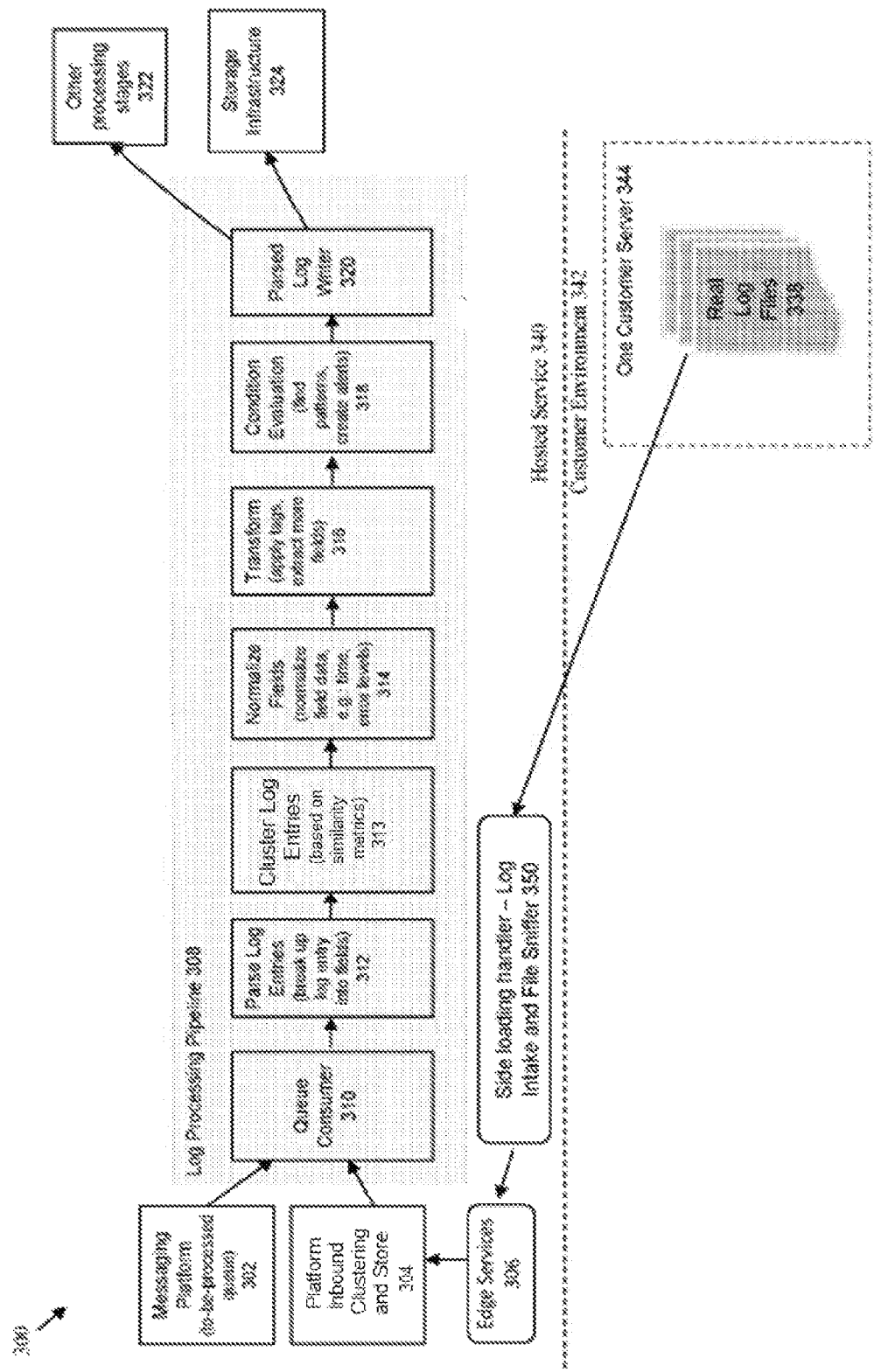
FIG. 3C illustrates another embodiment of FIG. 3B.

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

According to aspects of the present disclosure, many business applications have transactional flows (e.g., a flow of one or more stages of a transaction). The flow may be identified using a flow key (e.g., a transaction ID) or any other field present in a log file. The flow key can be used to connect different records and to identify the steps involved in a particular transaction. This feature facilitates the determination of which transaction IDs correspond to a failed operation in the flow in a particular time interval.

Certain embodiments provide systems and methods for predicting a threshold number (e.g., a subset, the minimal number, the most relevant tests) of automated software tests that can sufficiently test a unit of work delivery with a high level of confidence. In some implementations, the binary code of a baseline version of the software application can be compared with the binary code of the modified software application to determine the functions that are affected by the revisions included in the unit of work delivery. Further, in some implementations, the systems and methods may include a compiler that is configured to induce and/or generate instrumented calls during entry and/or exit of functions to effectively map functions with the test identifiers of the tests being performed.

Advantageously, the compiler can be configured to map a test identifier to the functions executed during performance of a test, and that map can be used to predict the tests to perform on a unit of work delivery. As another advantage, the binary code (e.g., the compiled source code), rather than the source code, is used to determine which functions are impacted by the revisions included in the unit of work delivery. For example, a revision to one line of source code can have a significant impact on the binary code, and thus, evaluating the binary code instead of the source code provides a more complete picture of the impact of revisions to the software application.

Figure 4:
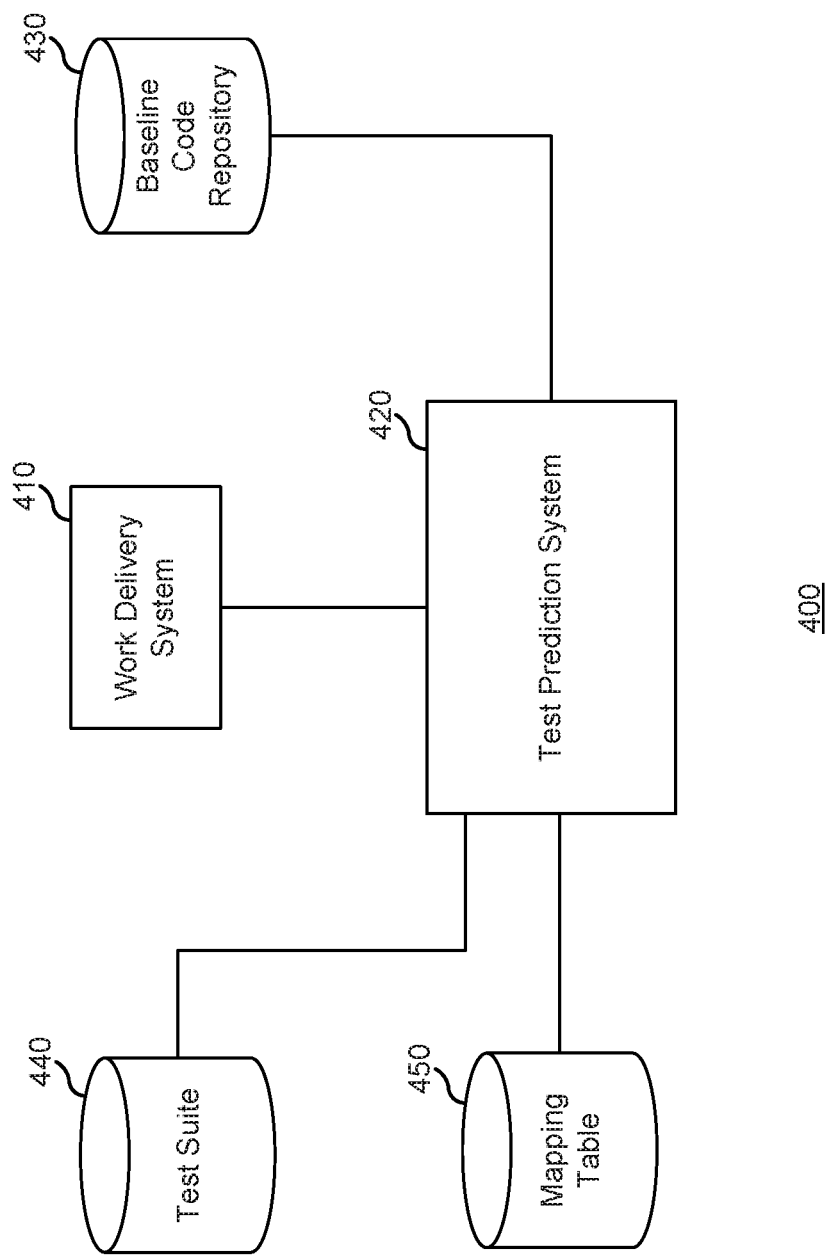
FIG. 4 is a block diagram illustrating a network environment for systems disclosed herein.

FIG. 4 is a block diagram illustrating a network environment for systems disclosed herein. In some implementations, network environment 400 can include work delivery system 410 and test prediction system 420. Further, in some implementations, network environment 400 can additionally include several data stores, including baseline code repository 430, test suite data store 440, and mapping table data store 450. Network environment 400 can enable the automatic prediction of a threshold number of automated software tests to sufficiently test a unit of work delivery that was submitted to work delivery system 410. Sufficiently testing a software application can include testing the software application for bugs or errors with a defined level of confidence. For example, the defined level of confidence can be a level of confidence that the predicted subset of automated software tests would identify any bugs or errors included in the unit of work delivery.

Network environment 400 can include several data stores, including baseline code repository 430, test suite data store 440, and mapping table data store 450. Baseline code repository 430 can be a database that stores the source code for a plurality of software applications. In some implementations, baseline code repository 430 can store the source code and/or the binary code (e.g., the compiled version of the source code). Further, baseline code repository 430 can also store different versions of the source code for each software application. For example, when a unit of work delivery has successfully passed the testing phase and can be integrated into the source code without issue, baseline code repository 430 can store the latest version of the source code (e.g., including the most recent integrated unit of work delivery). Test suite data store 440 can store all available automated software tests. For example, an automated software test can be any set of test inputs, execution conditions, and expected results developed for a particular objective, such as to exercise a particular program path or to verify compliance with a specific requirement. Mapping table data store 450 can be a persistent storage device that stores the mapping table described in greater detail below. Further, mapping table data store 450 can communicate with test prediction system 420 to receive data from the in-memory table (shown in FIG. 5), which is stored in test prediction system 420. For example, a flushing mechanism can be provided to move data from the in-memory table of test prediction system 420 to the persistent storage of mapping table data store 450 at regular or irregular intervals.

Work delivery system 410 can include computers, processing devices, memory devices, and/or servers. Further, work delivery system 410 can be configured to enable users (e.g., developers) to log into a work delivery environment. For example, the work delivery environment can include one or more interfaces, web applications, or native applications that enable a user to submit a unit of work delivery for a particular software application. A unit of work delivery may be a particular instance of revisions made to the underlying code of the software application. For example, the unit of work delivery may include source code, binaries, and/or configuration files that were modified by the user.

Test prediction system 420 can include computers, processing devices, memory devices, and/or servers. Further, test prediction system 420 can be configured to communicate with work delivery system 410 and each of the data stores included in network environment 400. Test prediction system 420 can be configured to predict the threshold number of automated software tests that can be performed to sufficiently test a unit of work delivery with a high degree of confidence. In some implementations, the test prediction system 420 can access a mapping table (described later herein) to determine which tests should be executed based on the revisions to the software code that were submitted for a given unit of work delivery.

In some implementations, test prediction system 420 can receive a unit of work delivery from work delivery system 410 and compile the code included in the unit of work delivery. The code included in the unit of work delivery can include modifications to the source code of a software application. Compiling the unit of work delivery can include generating binary code (e.g., object modules) representing the machine-readable code of the software application. Test prediction system 420 can access a baseline version of the software application from baseline code repository 430 and compare the baseline version with the unit of work delivery. In some implementations, test prediction system 420 can access the source code of the software application (from baseline code repository 430) and compile the source code. In other implementations, test prediction system 420 can access the compiled source code (e.g., the binary code) of the software application from baseline code repository 430.

Further, the comparing is implemented by comparing the binary code of each of the baseline version of the software application with the binary code of the unit of work delivery. In some implementations, the unit of work delivery can include the entire source code including the revisions. In other implementations, the unit of work delivery can include only the portion of the source code that contains the revisions. For example, the minimal unit of work delivery may be a translation unit. The translation unit may include the ultimate input that is fed into the compiler from which an object file may be generated. In a scenario where only one function is changed (e.g., the get function), the entire translation unit is delivered during the code check-in (e.g., during compiling). Comparing the baseline binary code with the unit of work delivery binary code can result in identifying the functions for which there is a difference between the source code and the unit of delivery. For example, the comparison can provide a list of function names for which the object module of a function is impacted due to the revisions included in the unit of work delivery. The affected function names can then be looked up using the mapping table to determine the test identifiers that correspond to the affected functions.

In some implementations, test prediction system 420 can return a list of predicted automated software tests to work delivery system 410. For example, when work delivery system 410 receives the list of the predicted tests, the list can be displayed on a user device operated by the user who is logged into work delivery system 410. In some implementations, each test included in the list can be automatically performed on the unit of work delivery. In other implementations, the list can be displayed on the user device with a score for each test included in the list. The higher the score, the higher the confidence level assigned to that test. In this context, confidence level can refer to the likelihood that the test corresponds to the affected functions in the unit of work delivery. For example, in a situation where a full test suite includes 6000 tests, test prediction system 420 can return a list of 100 automated software tests that are predicted to sufficiently test the unit of work delivery. Each test in the list of 100 tests can be displayed with a corresponding score that represents the confidence level for that test. The list of 100 tests can be ranked and ordered by the score. In this example, the user can make decisions on which tests to run based on the score associated with the test. For example, the user can select the top 40 tests of the 100 tests to perform on the unit of work delivery. In other examples, a group of tests from the 100 tests can be automatically determined based on the scores of the tests. As a non-limiting example, the group of tests can include all tests with a score of 70 or over. In this example, each test in the group of tests can be automatically performed on the unit of work delivery. In some implementations, the score can be calculated based on any one or more of the number of times the test has been performed within a defined time period (e.g., over the last week), the number of functions executed as part of the test when the test is performed, the type of functions that are identified as being modified in the unit of work delivery, a prediction generated by test prediction system 420, and other suitable factors.

Figure 5:
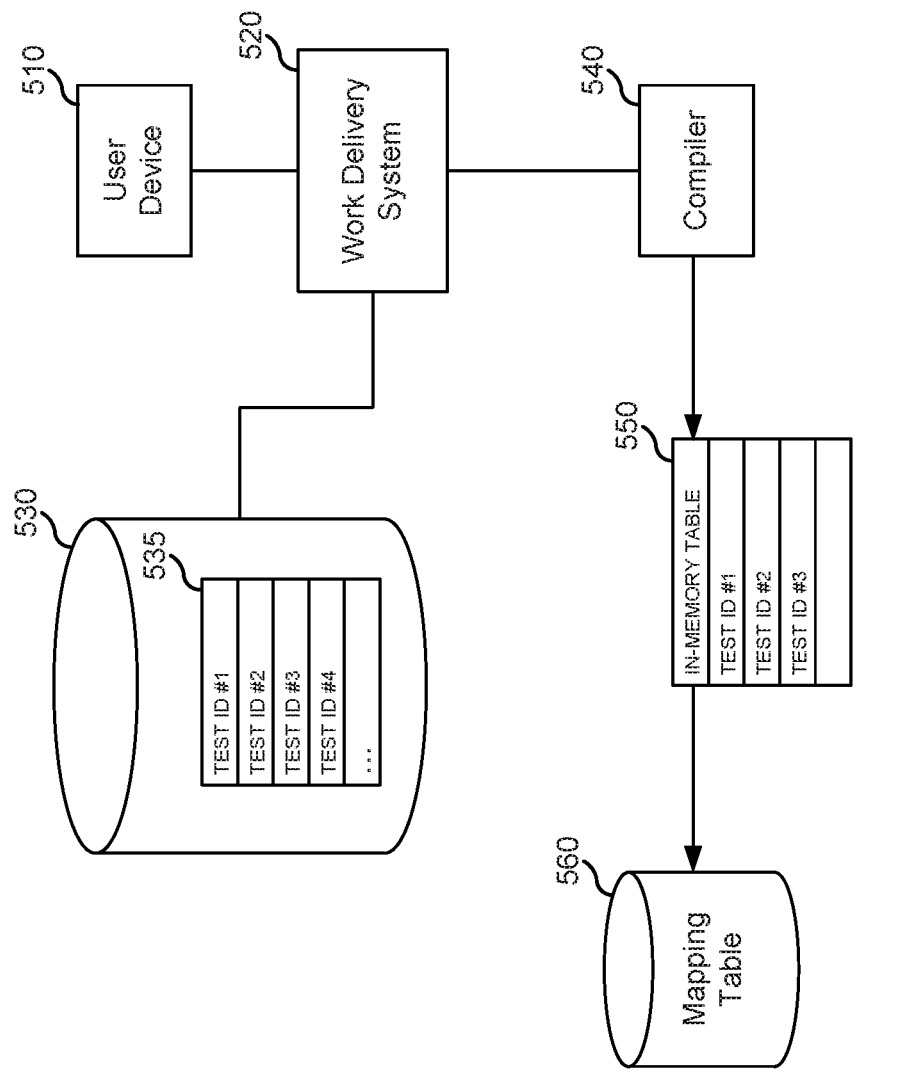
FIG. 5 is a block diagram illustrating a network environment configured to generate mapping tables.

FIG. 5 is a block diagram illustrating a network environment configured to generate mapping tables. In some implementations, network environment 500 can include user device 510, work delivery system 520, test suite data store 530 (storing the full test suite 535), compiler 540, and mapping table data store 560. Further, network environment 500 can be configured as part of an exploratory phase, which is a process for generating the mapping table. Certain embodiments of the present disclosure can use network environment 500 to capture the names of the functions executed during the performance of tests, and also to log the functions along with their associated test identifiers. In addition, the number of times a function is executed within a defined time period (e.g., the previous week) can be counted on an on-going basis. User device 510 can be any portable or non-portable computing device (e.g., laptop, desktop, smartphone, tablet, etc.) including at least one processor configured to execute one or more operations. Work delivery system 520 can be the same as, or similar to, work delivery system 410, and thus, the description is omitted here. Further, mapping table data store 560 can be the same as, or similar to, mapping table data store 450, and thus, the description is omitted here.

In some implementations, user device 510 can enable a user to run a web application that is configured to test software applications for bugs or errors. For example, the web application can facilitate access to work delivery system 520 so that the user can test a particular software application, and in some cases, test one or more units of work delivery. The web application can present an interface on user device 510. In some implementations, the interface can include an input element configured to receive input corresponding to the test identifier of a particular test that the user wants to perform. Once the test identifier and other details (e.g., identifier for the software application) have been inputted into the interface, the user can select a feature (e.g., a button or link) on the interface that causes instructions to be transmitted to work delivery system 520 that instruct the desired test to be performed on the software application. In some implementations, the test identifier can be captured by the web application and a communication including the test identifier (and, in some cases, other information including the functions executed as part of the test) can be transmitted to the test prediction system (e.g., test prediction system 420). The test prediction system can parse the communication to extract the test identifier and the one or more functions that are executed as part of the test associated with the test identifier. The extracted test identifier and function names can be stored in in-memory table 550, which is a data structure included in the test prediction system.

In some implementations, user device 510 can be a non-portable device (e.g., desktop) or portable device (e.g., mobile device) that can execute one or more native applications. The native application can be configured to test software applications for bugs or errors. When the user logs into the native application, an interface can be presented on user device 510. The interface can include an input element configured to receive input corresponding to a test identifier to be tested on a particular software application. When the test is ultimately performed, the test identifier can be captured by the native application (e.g., using dll injection into the target host processes) and a communication including the test identifier (and, in some cases, other information including the functions executed as part of the test) can be transmitted to the test prediction system (e.g., test prediction system 420). The test prediction system can parse the communication to extract the test identifier and the one or more functions that are executed as part of the test associated with the test identifier. The extracted test identifier and function names can be stored in in-memory table 550.

In some implementations, compiler 540 can be configured to support adding instrumented calls during function entry and/or exit. Further, compiler 540 can be configured to provide a mechanism that determines the function name from the function entry address through a system call or a compiler provided extension. In some implementations, compiler 540 and in-memory table 550 can each be included in the test prediction system (not shown). In some implementations, compiler 540 and in-memory table 550 can be part of any system in network environment 500. In some implementations, the in-memory table 550 may not be used, but rather, the data (that would be stored in the in-memory table) is stored directly in permanent storage. Further, the implementation of the instrumented call during function entry may be configured to capture the address of the caller function. In some implementations, compiler 540 can be configured so that the address of the caller function can be passed as a parameter to the instrumented function call. In other implementations, the compiler provided implicit function can be explicitly called to return the address of the caller function.

It will be appreciated that compiler 540 can be configured to generate instrumentation calls for entry and exits to functions. The instrumented calls can add the address of the caller function into in-memory table 550 when the function address is visited (e.g., executed). Further, a mechanism can be provided to map the function address with the test identifier of the test being performed at the current time. In situations where the function has not been executed earlier, the mechanism can be configured to add a new entry to in-memory table 550 with the new function name. If the function was previously executed, the function would already be included as an entry in in-memory table 550, in which case the entry is updated. Advantageously, the memory footprint of the collected data can be reduced.

Figure 6:
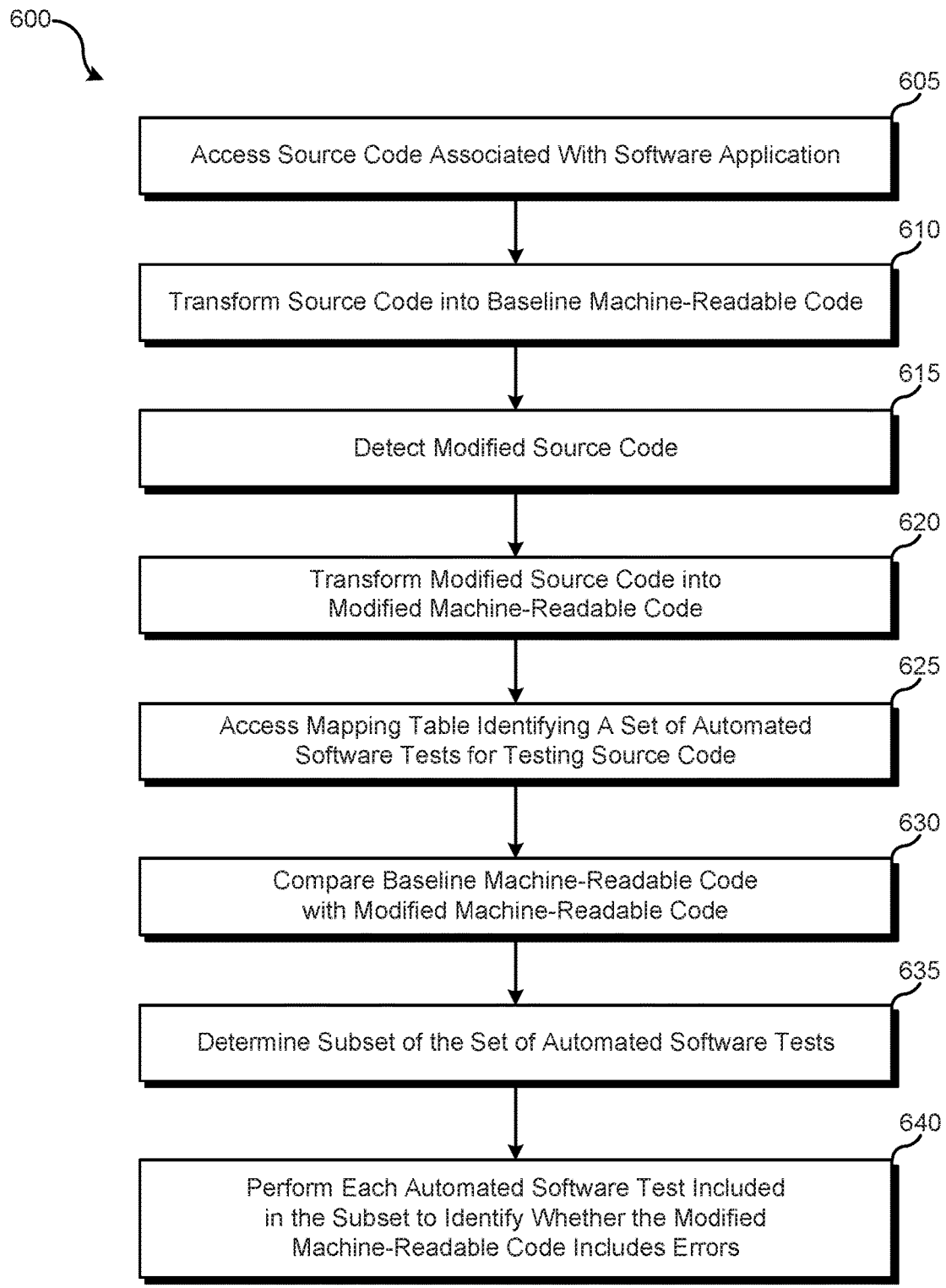
FIG. 6 is a flowchart illustrating an example process for predicting the threshold number of automated software tests from amongst all available tests in a continuous integration development environment.

FIG. 6 is a flowchart illustrating an example process for predicting the threshold number (e.g., the minimal number) of automated software tests from amongst all available tests in a continuous integration development environment. Process 600 can be performed, at least in part by, a test prediction system (e.g., test prediction system 420) and/or work delivery system (e.g., work delivery system 410). Further, process 600 can be performed to predict the threshold subset of automated software tests that are sufficient to test a software application based on a unit of work delivery. Sufficiently testing a software application can include testing the software application for bugs or errors with a defined level of confidence. For example, the level of confidence can be defined by a user or one or more algorithms.

Process 600 begins at block 605 where source code associated with a software application is accessed. The source code can be the underlying executable code (e.g., human-readable code) of the software application. The source code can include code in any programming language, and thus, the present disclosure is not limited to any specific programming language. Further, the source code can include any number or type of executable functions that can be executed when the software application runs.

In some implementations, to facilitate generating the mapping table, a stub can be added to, associated with, or included in executable functions in software applications. A stub can include code that is specific to the executable function in which the stub is included. For example, a stub can be a small function that is called every time the corresponding function is called. When the compiler is compiling source code of a software application, the compiler can flag every instance in which the compiler compiled an executable function included in the source code. The stubs enable the test prediction system to probe every function that is called in a software application. Further, when a particular function is probed, the function identifier (e.g., a function point) and the test which is being performed are extracted and stored in an in-memory table. As time progresses, the function identifiers that are included in the in-memory table are moved to more persistent storage in the mapping table data store (e.g., mapping table data store 560).

In other words, for every function that is executed, the compiler automatically calls the stub that corresponds to the executing function. The stub is used to determine which test is currently being run while the function was executed. To illustrate, a particular test can be executed on a code base that includes 100 functions. Each of the functions may be associated with an activity (e.g., a bank transfer). When the particular test is being executed on the code base, any time a particular function is executed, the stub corresponding to the particular function is also called. When the stub is called, the stub determines which function is being executed and which test is being performed. Data representing the function identifier of the executing function and the particular test (e.g., a test identifier (ID)) that is running is generated and initially stored in the in-memory table. In some implementations, a flushing mechanism is provided that takes the data stored in the in-memory table (e.g., stored in the test prediction system) and moves that data to a database (e.g., mapping table data store 560). Advantageously, the temporary storage of the function identifier and the test identifier in the in-memory table avoids slowing down access to the mapping table data store and reducing performance of the overall system.

At block 610, the source code is transformed into baseline machine-readable code. In some implementations, transforming the source code into baseline machine-readable code can include compiling the source code. In these implementations, the baseline machine-readable code can be the binary code that results from compiling the source code. Further, transforming the source code into the baseline machine-readable code can include compiling the executable functions that are included in the source code. Further, the source code can be the human-readable code that represents the software application before the unit of work delivery was submitted to the work delivery system for testing. For example, the source code can be the state of the software code before the revisions included in the unit of delivery are submitted for integration into the software code.

At block 615, the test prediction system can detect modified source code. In some implementations, modified source code can be a modified version of the source code. For example, when a developer completes a unit of work delivery, which includes revisions to the source code, the developer can submit the unit of work delivery to the work delivery system for testing. The test prediction system can detect that the source code was modified in the unit of work delivery that was submitted to the work delivery system. As only a non-limiting example, the unit of work delivery can include a modification to the source code that adds a feature to or modifies existing functions of the software application.

Modifying the source code can include a modification to an executable function included in the source code. An executable function included in the source code can be directly (e.g., the function code is revised) or indirectly modified (e.g., code outside of the function code is revised) by the revisions included in the unit of work delivery. For example, if the source code includes a macro (which is not a function), a developer can revise the code that represents the macro. However, the macro can be used in or accessed by any number of functions. In this example, while the revisions were made to the macro (e.g., code outside of the function code of a function), nonetheless, one or more functions were impacted because the macro was used as part of other functions.

At block 620, the test prediction system can transform the modified source code into modified machine-readable code. In some implementations, transforming the modified source code into modified machine-readable code can include compiling the modified source code. In these implementations, the modified machine-readable code can be the binary code that results from compiling the modified source code. In some implementations, the modified source code can be the source code including the revisions of the unit of work delivery. In other implementations, the modified source code can include the segment or portion of code that was revised in the unit of work delivery.

At block 625, the test prediction system can access the mapping table data store to access a mapping table. In some implementations, the mapping table can identify a set of tests that can be performed on the source code to test for bugs or errors in the source code. Each test of the set of tests can be associated with one or more executable functions. In some examples, the set of tests can represent the full suite of automated software tests available to test software applications. In other examples, the tests included in the set of tests can represent a portion of all available tests in the full suite of tests. In these examples, the portion of tests included in the mapping table can represent the most frequently executed tests or tests that have been recently executed by developers. Further, the mapping table can include the one or more executable functions that are included in the source code. As will be described in further detail below, the mapping table can be queried to identify the tests that should be run on the affected functions (e.g., the functions that were impacted or affected by the unit of work delivery) included in the modified machine-readable code.

In some implementations, the mapping table can be generated by configuring the compiler to add instrumentation calls for entry and exit to the functions. For example, an instrumentation call for entry and exit to a function can generate a trace that probes a function that is currently being executed or compiled. The trace can identify the function identifier of the function that is being compiled and the test identifier in which the function is used. Further, the generated trace is stored in an in-memory table (e.g., in a storage device in the test prediction system). At regular or irregular intervals, the data stored in the in-memory table can be flushed and moved to more persistent storage in the database (e.g., the mapping table data store). To illustrate, when the compiler compiles the source code of a software application, the compiler generates instrumentation calls for entry and exit to each function included in the source code. Further, the instrumentation calls can include an entry function that is configured to add the function address of the caller and the test identifier of the test being run to the in-memory table.

At block 630, the test prediction system can compare the baseline machine-readable code with the modified machine-readable code. The comparison between the baseline machine-readable code and the modified machine-readable code can identify the differences between the baseline version of the software application and the version of the software application that includes the revisions of the unit of work delivery. Further, the comparison can result in identifying the function identifier associated with the modified executable function. As a non-limiting example, the unit of work delivery may include code that modifies the source code to change parameters of a first function and a second function, each of which are included in the source code. Comparing the baseline machine-readable code with the modified machine-readable code can result in the identification of the modified first function and the modified second function.

At block 635, the test prediction system can access the mapping table to determine a subset of the set of tests. Continuing with the example above, if the first function and the second function are identified as being modified in the comparing step of block 630, the mapping table can be queried using the first function identifier and the second function identifier. In response to the query, the mapping table (e.g., a lookup table) can identify the test identifiers that correspond to each of the first function identifier and the second function identifier. For example, the first function identifier can correspond to a first test in the mapping table. Additionally, the second function identifier can correspond to a second test in the mapping table. In this example, the first test and the second test can be identified as the subset of the set of tests.

At block 640, the test prediction system can perform each test of the subset of tests to identify whether the modified machine-readable code includes one or more errors. Continuing again with the example above, the test prediction system can perform each of the first test and the second test. In this example, the full suite of tests (e.g., 6000 tests, 7000 tests, and so on) does not need to be performed because only the first function and the second function were modified. Accordingly, as an advantage, only the first test, which can be a test case for the first function, and the second test, which can be a test case for the second function, are performed, thereby significantly reducing the amount of time needed to test units of work delivery. Using embodiments of the present disclosure, testing can be faster so as to meet short delivery cycles and processing resources for testing can be efficiently managed.

It will be appreciated that defining the mapping table can include performing a test (e.g., at any time on any software application), identifying the function(s) that are called during performance of the test (e.g., using the stubs of the functions called during the test), and storing the correlation between the test being performed and the functions being called during performance of the test. Further, mapping the executable functions can include storing the test identifier and the corresponding functions (that are called during the test) in a data structure, such as the mapping table.

It will also be appreciated that, when a new test is added to the set of tests, the new test is added to the mapping table when the new test is performed. Performing the new test can include calling at least one executable function. For example, there may be a scenario where a quality assurance (QA) team has not written a test case to test a particular function. In this scenario, a feedback mechanism can be provided that notifies the QA team if a new tests needs to be added for the particular function.

It will also be appreciated that comparing the baseline machine-readable code with the modified machine-readable code can include evaluating one or more differences between the baseline machine-readable code and the modified machine-readable code to identify at least one executable function that is associated with the one or more differences.

In addition, it will be appreciated that, when an executable function is detected in the baseline machine-readable code (e.g., during compiling of the source code), the stub associated with the executable function is called. Calling the stub can include identifying the executable function which is currently executing and the one or more tests that are currently being performed.

Figure 7:
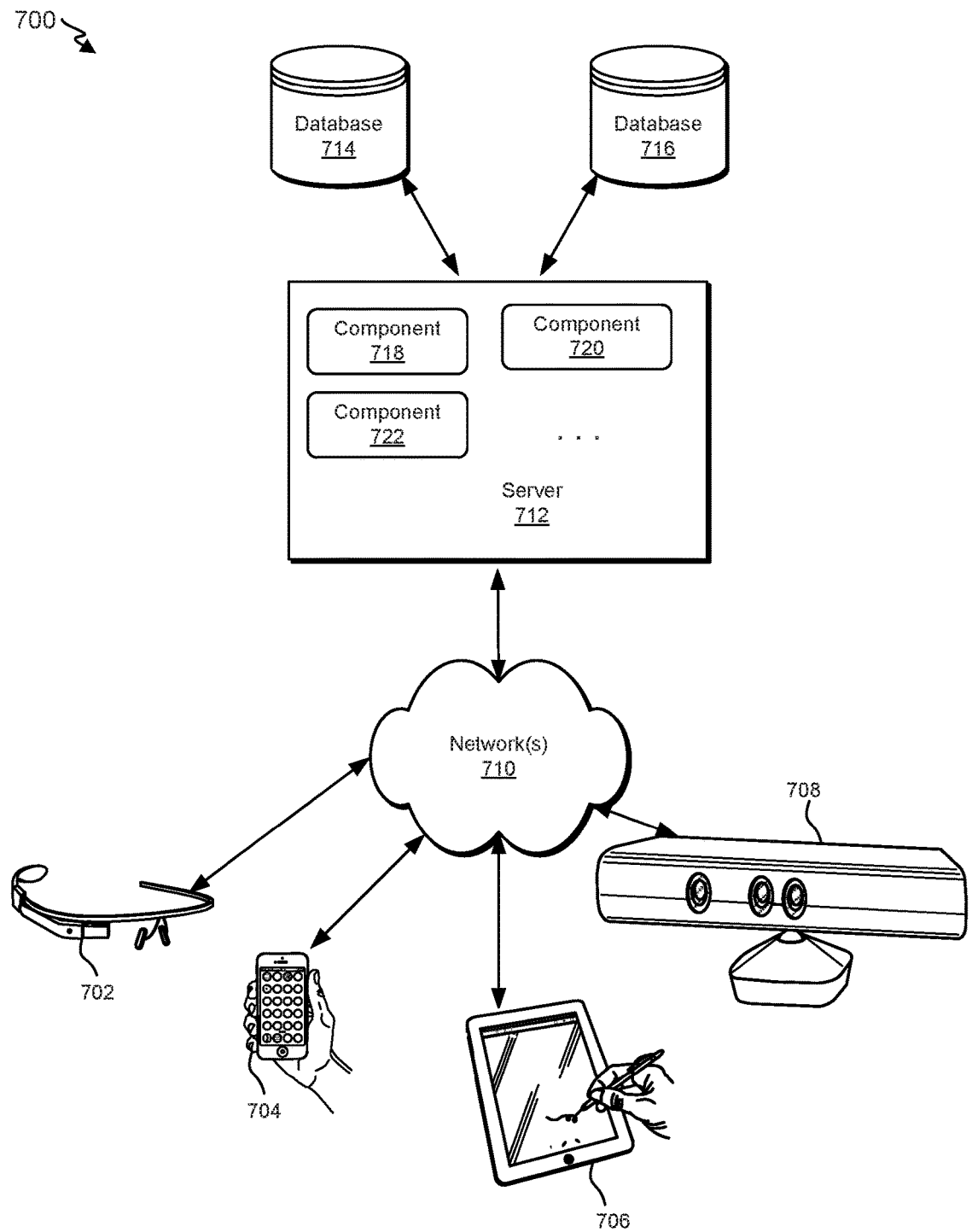
FIG. 7 depicts a simplified diagram of a distributed system for implementing one of the embodiment.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
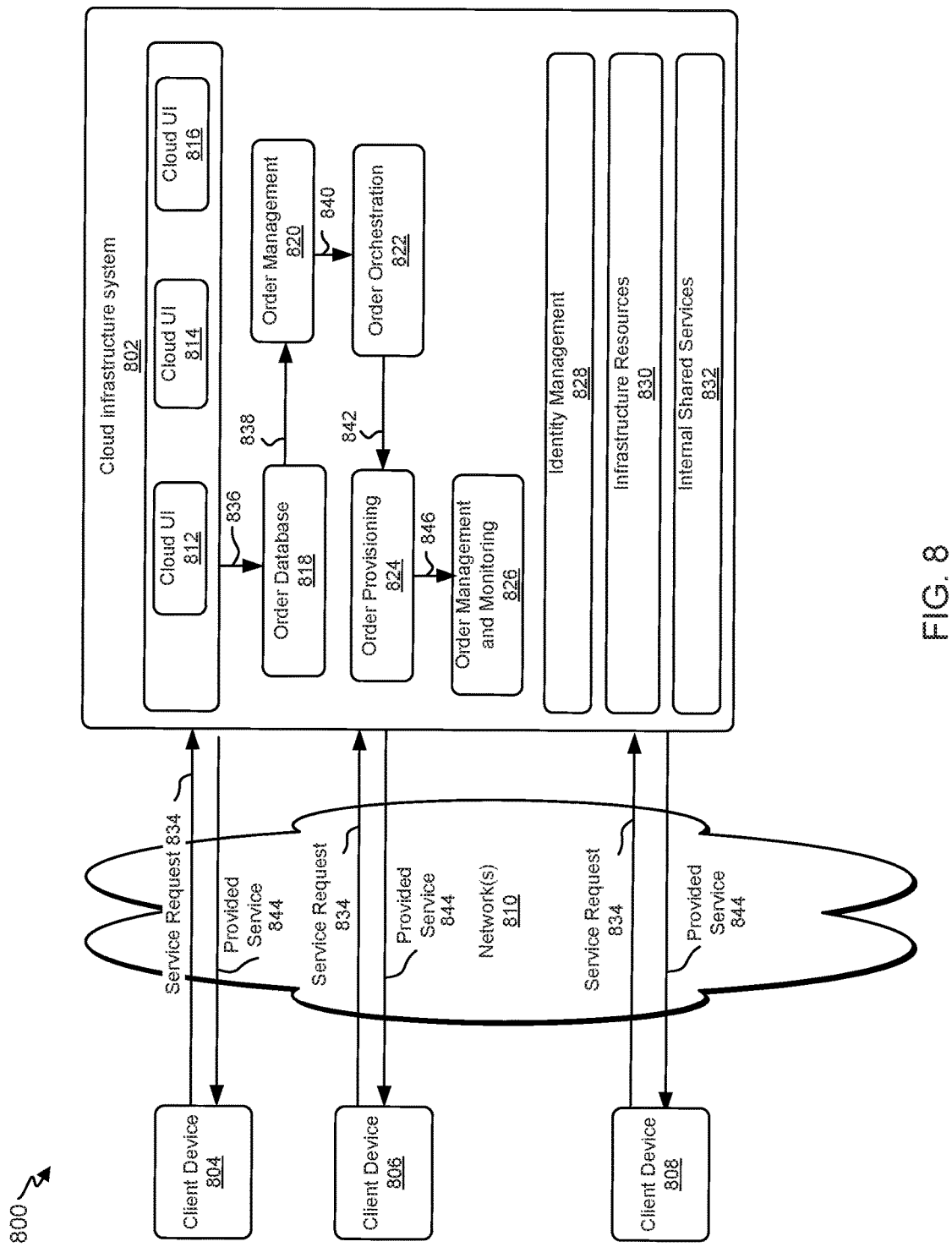
FIG. 8 is a simplified block diagram of one or more components of a system environment, in accordance with an embodiment of the present disclosure.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
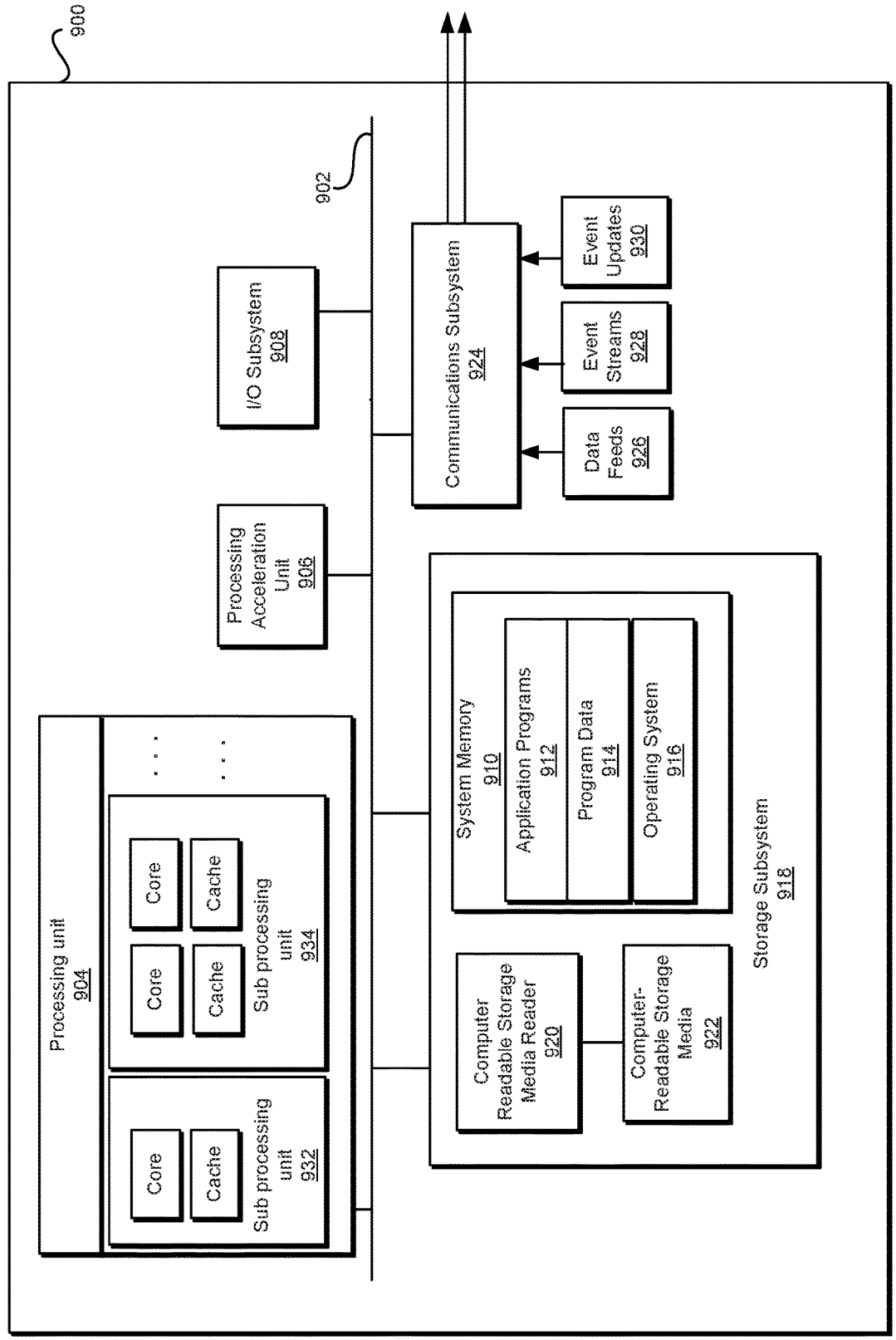
FIG. 9 illustrates an exemplary computer system, in which various embodiments of the present invention may be implemented.

FIG. 9 illustrates an exemplary computer system 900, in which various embodiments of the present invention may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 918 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   accessing source code associated with one or more applications, the source code including one or more executable functions, each executable function of the one or more executable functions corresponding to a stub, the stub including executable code that identifies one or more tests to be performed on the executable function, and each of the one or more tests including instructions for detecting errors in the executable function;
   transforming the source code into baseline machine-readable code, the transformation of the source code including compiling the one or more executable functions included in the source code;

detecting modified source code, the modified source code including a modification to an executable function of the one or more executable functions included in the source code;

transforming the modified source code into modified machine-readable code;

accessing a mapping table identifying a plurality of tests, one or more tests of the plurality of tests corresponding to an executable function of the one or more executable functions included in the source code, wherein each test of the plurality of tests is detected by a compiler upon executing the test at a previous time, and wherein upon detection by the compiler at the previous time, the detected test is stored in the mapping table;

comparing the baseline machine-readable code with the modified machine-readable code, the comparison resulting in identifying the modified executable function;

determining a group of tests from amongst the plurality of tests, the group of tests being determined based on the comparison, the determination of each test in the group of tests being performed using the mapping table and the modified executable function; and performing each test of the group of tests to identify whether the modified machine-readable code includes one or more errors.

2. The computer-implemented method of claim 1, wherein defining the mapping table comprises:

performing each test of the plurality of tests;

identifying one or more executable functions that are called during performance of each test, the identification using the stub associated with the executable function; and mapping the one or more executable functions that are called to a test identifier of the test being performed.

3. The computer-implemented method of claim 2, wherein mapping the one or more executable functions includes storing the test identifier and the corresponding one or more executable functions in a data structure as the mapping table.

4. The computer-implemented method of claim 3, wherein when a new test is added to the plurality of tests, the new test is added to the mapping table when the new test is detected by the compiler executing the new test, wherein executing the new test includes calling at least one executable function.

5. The computer-implemented method of claim 1, wherein comparing the baseline machine-readable code with the modified machine-readable code comprises:

determining one or more differences between the baseline machine-readable code and the modified machine-readable code; and evaluating the one or more differences to identify at least one executable function that is associated with the one or more differences.

6. The computer-implemented method of claim 1, wherein when an executable function of the one or more executable functions is detected in the baseline machine-readable code, the stub associated with the executable function is called, wherein calling the stub includes identifying the executable function and a test being performed on the executable function.

7. The computer-implemented method of claim 1, wherein, during compiling of the source code, when each instance an executable function is detected, a stub is added to the function.

8. A system, comprising:

one or more data processors; and a non-transitory computer-readable storage medium containing instructions which, when executed on the one or more data processors, cause the one or more data processors to perform operations including:

accessing source code associated with one or more applications, the source code including one or more executable functions, each executable function of the one or more executable functions corresponding to a stub, the stub including executable code that identifies one or more tests to be performed on the executable function, and each of the one or more tests including instructions for detecting errors in the executable function;

transforming the source code into baseline machine-readable code, the transformation of the source code including compiling the one or more executable functions included in the source code;

detecting modified source code, the modified source code including a modification to an executable function of the one or more executable functions included in the source code;

transforming the modified source code into modified machine-readable code;

accessing a mapping table identifying a plurality of tests, one or more tests of the plurality of tests corresponding to an executable function of the one or more executable functions included in the source code, wherein each test of the plurality of tests is detected by a compiler upon executing the test at a previous time, and wherein upon detection by the compiler at the previous time, the detected test is stored in the mapping table;

comparing the baseline machine-readable code with the modified machine-readable code, the comparison resulting in identifying the modified executable function;

determining a group of tests from amongst the plurality of tests, the group of tests being determined based on the comparison, the determination of each test in the group of tests being performed using the mapping table and the modified executable function; and performing each test of the group of tests to identify whether the modified machine-readable code includes one or more errors.

9. The system of claim 8, wherein defining the mapping table comprises:

performing each test of the plurality of tests;

identifying one or more executable functions that are called during performance of each test, the identification using the stub associated with the executable function; and mapping the one or more executable functions that are called to a test identifier of the test being performed.

10. The system of claim 9, wherein mapping the one or more executable functions includes storing the test identifier and the corresponding one or more executable functions in a data structure as the mapping table.

11. The system of claim 10, wherein when a new test is added to the plurality of tests, the new test is added to the mapping table when the new test is detected by the compiler executing the new test, wherein executing the new test includes calling at least one executable function.

12. The system of claim 8, wherein comparing the baseline machine-readable code with the modified machine-readable code comprises:

determining one or more differences between the baseline machine-readable code and the modified machine-readable code; and evaluating the one or more differences to identify at least one executable function that is associated with the one or more differences.

13. The system of claim 8, wherein when an executable function of the one or more executable functions is detected in the baseline machine-readable code, the stub associated with the executable function is called, wherein calling the stub includes identifying the executable function and the one or more tests previously performed on the executable function.

14. The system of claim 8, wherein, during compiling of the source code, when each instance an executable function is detected, a stub is added to the function.

15. A computer-program product tangibly embodied in a non-transitory machine-readable storage medium, including instructions configured to cause a data processing apparatus to perform operations including:

accessing source code associated with one or more applications, the source code including one or more executable functions, each executable function of the one or more executable functions corresponding to a stub, the stub including executable code that identifies one or more tests to be performed on the executable function, and each of the one or more tests including instructions for detecting errors in the executable function;

transforming the source code into baseline machine-readable code, the transformation of the source code including compiling the one or more executable functions included in the source code;

detecting modified source code, the modified source code including a modification to an executable function of the one or more executable functions included in the source code;

transforming the modified source code into modified machine-readable code;

accessing a mapping table identifying a plurality of tests, one or more tests of the plurality of tests corresponding to an executable function of the one or more executable functions included in the source code, wherein each test of the plurality of tests is detected by a compiler upon executing the test at a previous time, and wherein upon detection by the compiler at the previous time, the detected test is stored in the mapping table;

comparing the baseline machine-readable code with the modified machine-readable code, the comparison resulting in identifying the modified executable function;

determining a group of tests from amongst the plurality of tests, the group of tests being determined based on the comparison, the determination of each test in the group of tests being performed using the mapping table and the modified executable function; and performing each test of the group of tests to identify whether the modified machine-readable code includes one or more errors.

16. The computer-program product of claim 15, wherein defining the mapping table comprises:

performing each test of the plurality of tests;

identifying one or more executable functions that are called during performance of each test, the identification using the stub associated with the executable function; and mapping the one or more executable functions that are called to a test identifier of the test being performed.

17. The computer-program product of claim 16, wherein mapping the one or more executable functions includes storing the test identifier and the corresponding one or more executable functions in a data structure as the mapping table.

18. The computer-program product of claim 17, wherein when a new test is added to the plurality of tests, the new test is added to the mapping table when the new test is detected by the compiler executing the new test, wherein executing the new test includes calling at least one executable function.

19. The computer-program product of claim 15, wherein comparing the baseline machine-readable code with the modified machine-readable code comprises:

determining one or more differences between the baseline machine-readable code and the modified machine-readable code; and evaluating the one or more differences to identify at least one executable function that is associated with the one or more differences.

20. The computer-program product of claim 15, wherein when an executable function of the one or more executable functions is detected in the baseline machine-readable code, the stub associated with the executable function is called, wherein calling the stub includes identifying the executable function and the one or more tests previously performed on the executable function.

* * * * *

UNITED STATES PATENT AND TRADEMARK OFFICE
CERTIFICATE OF CORRECTION

PATENT NO.           : 10,310,969 B2
APPLICATION NO.      : 15/610473
DATED                : June 4, 2019
INVENTOR(S)          : Bhattacharjee et al.

It is certified that error appears in the above-identified patent and that said Letters Patent is hereby corrected as shown below:

In the Specification

In Column 5, Line 45, delete "I11" and insert -- 111 --, therefor.

In Column 5, Line 49, delete "that that" and insert -- that --, therefor.

Signed and Sealed this
Twenty-eighth Day of July, 2020

Andrei Iancu
*Director of the United States Patent and Trademark Office*